(12) United States Patent
Kim et al.

(10) Patent No.: US 10,439,642 B2
(45) Date of Patent: Oct. 8, 2019

(54) ERROR CORRECTION METHOD OF DATA STORAGE DEVICE

(71) Applicant: SK hynix Inc., Gyeonggi-do (KR)

(72) Inventors: Nack Hyun Kim, Gyeonggi-do (KR); Dong Wook Kim, Chungcheongbuk-do (KR); Min Kyu Lee, Chungcheongbuk-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/632,549

(22) Filed: Jun. 26, 2017

(65) Prior Publication Data

US 2018/0191373 A1    Jul. 5, 2018

(30) Foreign Application Priority Data

Dec. 29, 2016  (KR) .................. 10-2016-0182715

(51) Int. Cl.

| G06F 11/00 | (2006.01) |
|---|---|
| G08C 25/00 | (2006.01) |
| H03M 13/00 | (2006.01) |
| H04L 1/00 | (2006.01) |
| H03M 13/03 | (2006.01) |
| H04L 9/30 | (2006.01) |
| H03M 13/29 | (2006.01) |
| H03M 13/37 | (2006.01) |
| H03M 13/11 | (2006.01) |
| H03M 13/15 | (2006.01) |

(52) U.S. Cl.
CPC .......... *H03M 13/03* (2013.01); *H03M 13/293* (2013.01); *H03M 13/2909* (2013.01); *H03M 13/3746* (2013.01); *H04L 9/304* (2013.01); *H03M 13/1102* (2013.01); *H03M 13/152* (2013.01); *H03M 13/1515* (2013.01); *H03M 13/63* (2013.01)

(58) Field of Classification Search
CPC ........ H03M 13/03; H03M 13/63; H04L 9/304
See application file for complete search history.

(56) References Cited

U.S. PATENT DOCUMENTS

| 9,312,885 B2 | 4/2016 | Sakaue et al. | |
|---|---|---|---|
| 2010/0313099 A1* | 12/2010 | Yamaga | G06F 11/1012 714/755 |

FOREIGN PATENT DOCUMENTS

| KR | 10-2008-0052288 | 6/2008 |
|---|---|---|
| KR | 10-2013-0105666 | 9/2013 |
| KR | 10-2015-0073717 | 7/2015 |

* cited by examiner

*Primary Examiner* — Samir W Rizk
(74) *Attorney, Agent, or Firm* — IP & T Group LLP

(57) ABSTRACT

An error correction code processing method includes performing a first encoding operation for a data group of a first direction; performing a second encoding operation for a data group of a second direction, wherein the data group of the first direction shares one or more data with the data group of the second direction; performing a first decoding operation of correcting an error included in the data group of the first direction; and performing a second decoding operation of correcting an error included in the data group of the second direction when the first decoding operation fails.

13 Claims, 12 Drawing Sheets

| | Result | Error Data | Corrected Data |
|---|---|---|---|
| ① First direction decoding | Fail | $D_{11} / D_{12}$ | - |
| ② Second direction decoding | Success | $D_{11}$ | $D_{11}$ |
| ③ First direction decoding | Success | $D_{12}$ | $D_{12}$ |

FIG.9

| | Result | Error Data | Corrected Data |
|---|---|---|---|
| ① First direction decoding | Fail | $D_{22}$ / $D_{24}$ | - |
| ② Second direction decoding | Success | $D_{11}$ | $D_{11}$ |
| ③ First direction decoding | Fail | $D_{22}$ / $D_{24}$ | - |
| ④ Second direction decoding | Fail | $D_{12}$ / $D_{22}$ | - |
| ⑤ Second direction decoding (First direction decoding information reflected) | Success | $D_{12}$ / $D_{22}$ | $D_{12}$ / $D_{22}$ (or $D_{22}$) |
| ⑥ First direction decoding | Success | $D_{24}$ | $D_{24}$ |

ERROR CORRECTION METHOD OF DATA STORAGE DEVICE

CROSS-REFERENCES TO RELATED APPLICATION

The present application claims priority under 35 U.S.C. § 119(a) to Korean application number 10-2016-0182715, filed on Dec. 29, 2016, in the Korean Intellectual Property Office, which is incorporated herein by reference in its entirety.

BACKGROUND

1. Technical Field

Various embodiments generally relate to an error correction method of a data storage device using a nonvolatile memory device as a storage medium.

2. Related Art

Recently, the paradigm for the computer environment has been converted into ubiquitous computing so that computer systems can be used anytime and anywhere. Due to this fact, the use of portable electronic devices such as mobile phones, digital cameras, and notebook computers has rapidly increased. In general, such portable electronic devices use a data storage device which uses a memory device for storing data which may be used by the portable electronic devices.

A data storage device using a memory device provides advantages in that, since there is no mechanical driving part, stability and durability are excellent, an information access speed is high and power consumption is small. Examples of data storage devices having such advantages include a universal serial bus (USB) memory device, memory cards having various interfaces, a universal flash storage (UFS) device, and a solid state drive (SSD).

The data stored in a memory device may be changed by various causes. For example, data may be changed while data is stored in the memory device or data is read from the memory device. In order to manage a change in the data i.e., correct errors included in the data, an error correction code (ECC) algorithm may be used.

For instance, a process of adding an error correction code to data before the data is stored in a memory device is called an error correction encoding operation. Also, a process of correcting the error included in the data read from the memory device based on the error correction code and thereby recovering the read-out data to original data is called an error correction decoding operation. A data storage device may improve the reliability of data through error correction encoding and decoding.

SUMMARY

Various embodiments are directed to an error correction method for improving an error correction capability of a data storage device.

In an embodiment, an error correction code processing method may include: performing a first encoding operation for a data group of a first direction; performing a second encoding operation for a data group of a second direction, wherein the data group of the first direction shares one or more data with the data group of the second direction; performing a first decoding operation of correcting an error included in the data group of the first direction; and performing a second decoding operation of correcting an error included in the data group of the second direction when the first decoding operation fails.

In an embodiment, an error correction code processing method of a data storage device including a nonvolatile memory device used as a storage medium and an error correction code unit which performs an error correction code encoding operation and an error correction code decoding operation for data to be stored in and be outputted from the nonvolatile memory device may include: performing a first encoding operation of generating first parity data for a data group of a first direction; performing a second encoding operation of generating second parity data for a data group of a second direction which includes at least one data included in the data group of the first direction; performing a first decoding operation of correcting an error included in the data group of the first direction, based on the first parity data; and performing a second decoding operation of correcting an error included in the data group of the second direction, based on the second parity data, in the case where the first decoding operation fails.

According to the embodiments, because error correction decoding operations in a first direction and a second direction have dependency on each other, the error correction capability of a data storage device may be improved.

BRIEF DESCRIPTION OF THE DRAWINGS

The above and other features and advantages of the present invention will become more apparent to those skilled in the art to which the present invention pertains by the following detailed description with reference to the attached drawings in which:

FIG. 9 is a table illustrating decoding operations of FIG. 8.

DETAILED DESCRIPTION

Figure 1:
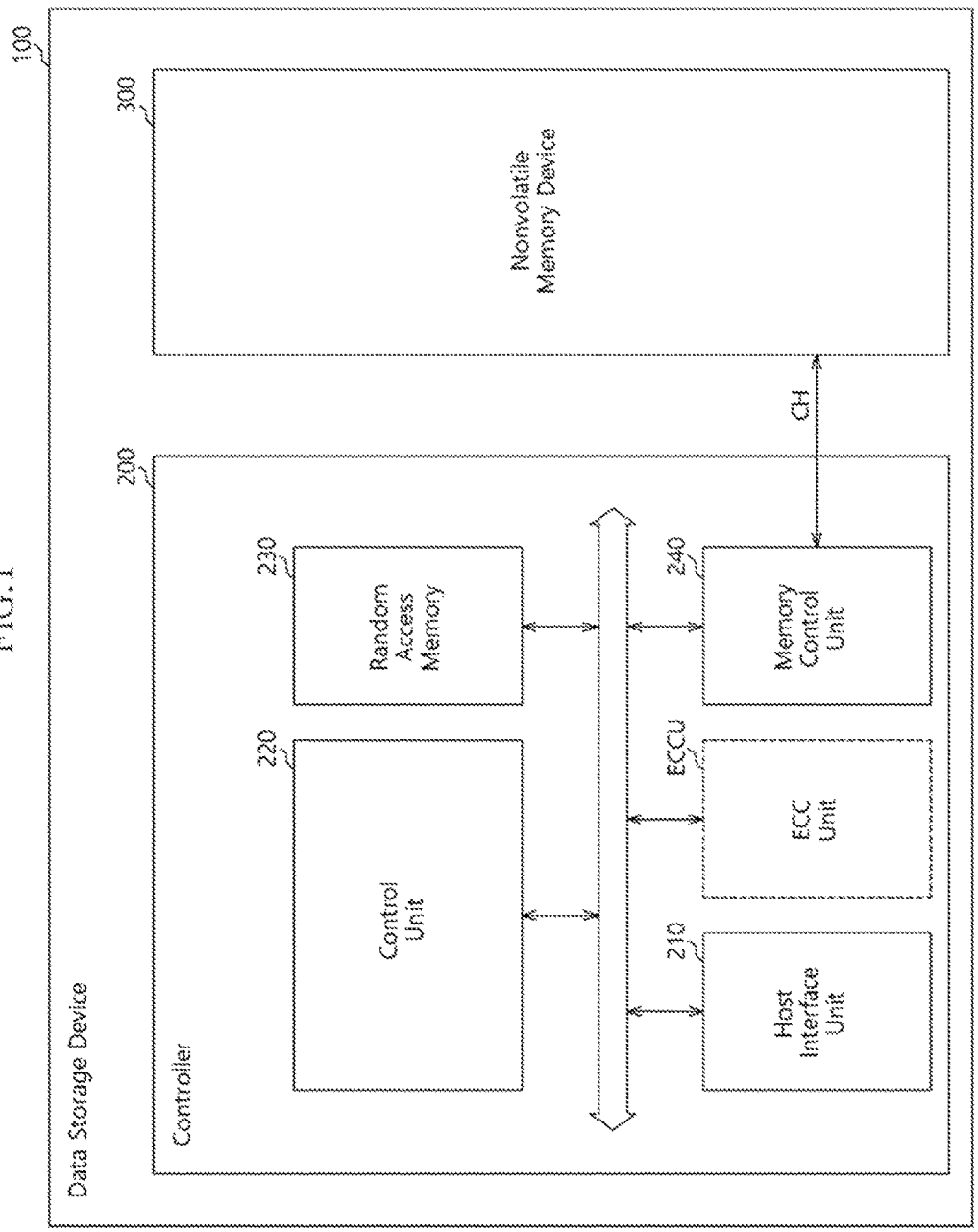
FIG. 1 is a block diagram illustrating a data storage device in accordance with an embodiment.

In the present invention, advantages, features and methods for achieving them will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can easily enforce the technical concept of the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes," "comprises," "comprising" and/or "including," when used in this specification, specify the presence of at least one stated feature, step, operation, and/or element, but do not preclude the presence or addition of one or more other features, steps, operations, and/or elements thereof.

Hereinafter, a method for processing an error correction code of a data storage device will be described below with reference to the accompanying drawings through various examples of embodiments.

FIG. 1 is a block diagram illustrating a data storage device 100 in accordance with an embodiment. The data storage device 100 may store data to be accessed by a host device (not shown) such as a mobile phone, an MP3 player, a laptop computer, a desktop computer, a game player, a TV, an in-vehicle infotainment system, and so forth. The data storage device 100 may also be referred to as a memory system.

The data storage device 100 may be configured as any one of various kinds of storage devices according to the protocol of an interface which is electrically coupled with the host device. For example, the data storage device 100 may be configured as any one of various kinds of storage devices such as a solid state drive, a multimedia card in the form of an MMC, an eMMC an RS-MMC and a micro-MMC, a secure digital card in the form of an SD, a mini-SD and a micro-SD, a universal serial bus (USB) storage device a universal flash storage (UFS) device, a Personal Computer Memory Card International Association (PCMCIA) card type storage device, a peripheral component interconnection (PCI) card type storage device, a PCI, express (PCI-E) card type storage device, a compact flash (CF) card, a smart media card, a memory stick, and so forth.

The data storage device 100 may be manufactured as any one among various kinds of package types. For example, the data storage device 100 may be manufactured as any one of various kinds of package types such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 100 may include a controller 200 and a nonvolatile memory device 300.

The controller 200 may include a host interface unit 210, a control unit 220, a random access memory 230, and a memory control unit 240. The controller 200 may selectively include an error correction unit ECCU. For example, in the case where the error correction unit ECCU is included in the nonvolatile memory device 300, the controller 200 may not include the error correction unit. ECCU. Conversely, in the case where the error correction unit ECCU is not included in the nonvolatile memory device 300, the controller 200 may include the error correction unit ECCU.

The host interface unit 210 may interface the host device and the data storage device 100. For example the host interface unit 210 may communicate with the host device by using any one among standard transmission protocols such as universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI) and PCI express (PCI-E) protocols.

The control unit 220 may control general operations of the controller 200. The control unit 220 may drive an instruction or an algorithm of a code type, that is, a software, loaded in the random access memory 230, and may control operations of function blocks in the controller 200. The control unit 220 may be configured by a micro control unit (MCU) or a central processing unit (CPU).

The random access memory 230 may store a software to be driven by the control unit 220. Further, the random access memory 230 may store data necessary for driving of the software. That is to say, the random access memory 230 may be used as the working memory of the control unit 220. The random access memory 230 may store data to be stored in the nonvolatile memory device 300 or data read from the nonvolatile memory device 300. In other words, the random access memory 230 may be used as a data buffer memory or a data cache memory. The random access memory 230 may be configured by a random access memory such as a dynamic random access memory (DRAM) or a static random access memory (SRAM).

The memory control unit 240 may control the nonvolatile memory device 300 according to control of the control unit 220. The memory control unit 240 may also be referred to as a memory interface unit. The memory control unit 240 may provide control signals to the nonvolatile memory device 300. The control signals may include a command, an address, a read control signal, a write control signal, a data strobe signal and so forth for controlling the nonvolatile memory device 300. The memory control unit 240 may provide data to the nonvolatile memory device 300 or may be provided with the data read from the nonvolatile memory device 300.

The error correction unit ECCU may perform an encoding operation of generating parity data for data to be stored in the nonvolatile memory device 300. Also, the error correction unit ECCU may perform a decoding operation of detecting and correcting an error of the data read from the nonvolatile memory device 300 based on parity data. The error correction unit ECCU will be described later in detail.

The nonvolatile memory device 300 may be coupled with the controller 200 through a channel CH which includes at least one signal line capable of transmitting a command, an address, control signals and data. The nonvolatile memory device 300 may be used as the storage medium of the data storage device 100.

The nonvolatile memory device 300 may be configured by any one of various types of nonvolatile memory devices such as a NAND flash memory device, a NOR flash memory device, a ferroelectric random access memory (FRAM) using a ferroelectric capacitor, a magnetic random access memory (MRAM) using tunneling magneto-resistive (TMR) layer, a phase change random access memory (PCRAM) using a chalcogenide alloy, and a resistive random access memory (RERAM) using a transition metal oxide. The ferroelectric random access memory (FRAM), the magnetic random access memory (MRAM), the phase change random access memory (PCRAM) and the resistive random access memory (RERAM) are a kind of nonvolatile random access memory devices capable of random access. The nonvolatile memory device 300 may be configured by a combination of a NAND flash memory device and the above-described various types of nonvolatile random access memory devices.

Figure 2:
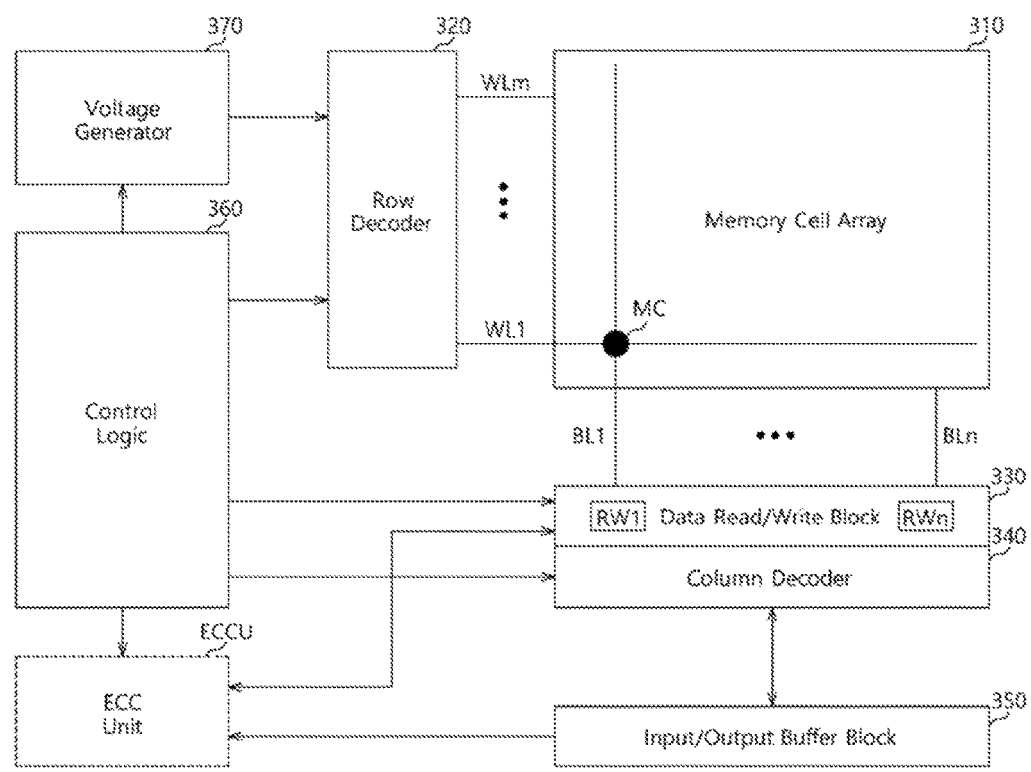
FIG. 2 is a block diagram illustrating a nonvolatile memory device in accordance with an embodiment.

FIG. 2 is a block diagram illustrating the nonvolatile memory device 300 in accordance with an embodiment.

Referring to FIG. 2, the nonvolatile memory device 300 may include a memory cell array 310, a row decoder 320, a data read/write block 330, a column decoder 340, an input/output buffer block 350, a control logic 360, and a voltage generator 370. The nonvolatile memory device 300 may selectively include an error correction unit. ECCU. For example, in the case where the error correction unit ECCU is included in the controller 200, the nonvolatile memory device 300 may not include the error correction unit ECCU. Conversely, in the case where the error correction unit ECCU is not included in the controller 200, the nonvolatile memory device 300 may include the error correction unit ECCU.

The memory cell array 310 may include memory cells MC which are arranged at areas where word lines WL1 to WLm and bit lines BL1 to BLn intersect with each other.

The row decoder 320 may be coupled with the memory cell array 310 through row lines including the word lines WL1 to WLm. The row decoder 320 may operate according to control of the control logic 360. The row decoder 320 may decode an address provided from the controller 200. The row decoder 320 may select and drive one or more of the word lines WL1 to WLm, based on a decoding result. For instance, the row decoder 320 may provide a first word line voltage provided from the voltage generator 370, to a selected word line among the word lines WL1 to WLm and a second word line voltage provided from the voltage generator 370 to the remaining word lines.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data in the memory cell array 310 in a program operation. For another example, the data read/write block 330 may operate as a sense amplifier which reads data from the memory cell array 310 in a read operation.

The column decoder 340 may operate according to control of the control logic 360. The column decoder 340 may decode an address provided from the controller 200. The column decoder 340 may select the read/write circuits RW1 to RWn of the data read/write block 330 corresponding to the bit lines BL1 to BLn, respectively, based on a decoding result.

The input/output buffer block 350 may transfer the command CMD and the address ADD from the controller 200 to the control logic 360. In the case where the error correction unit ECCU is included in the nonvolatile memory device 300, the input/output buffer block 350 may transfer the data from the controller 200 to the error correction unit ECCU or output the data provided from the error correction unit ECCU, that is, decoded data, to the controller 200. In the case where the error correction unit ECCU is not included in the nonvolatile memory device 300, the input/output buffer block 350 may transfer the data from the controller 200 to the data read/write block 330 through the column decoder 340, or transfer the data from the data read/write block 330 to the controller 200.

The control logic 360 may control general operations of the nonvolatile memory device 300, based on the control signals provided from the controller 200. For example, the control logic 360 may control internal function blocks to perform internal operations such as read, program and erase operations.

The voltage generator 370 may generate voltages to be, used in internal operations of the nonvolatile memory device 300. The voltages generated by the voltage generator 370 may be applied to the memory cell array 310, the row decoder 320 and the data read/write block 330.

The error correction unit ECCU may ECC-encode original data by generating parity data for the original data inputted through the input/output buffer block 350, and provide the encoded data to the data read/write block 330. The error correction unit ECCU may ECC-decode codeword read from the memory device 300 by detecting and correcting an error of the codeword based on the parity data included in the codeword. The error correction unit ECCU will be described hereunder in detail.

Figure 3:
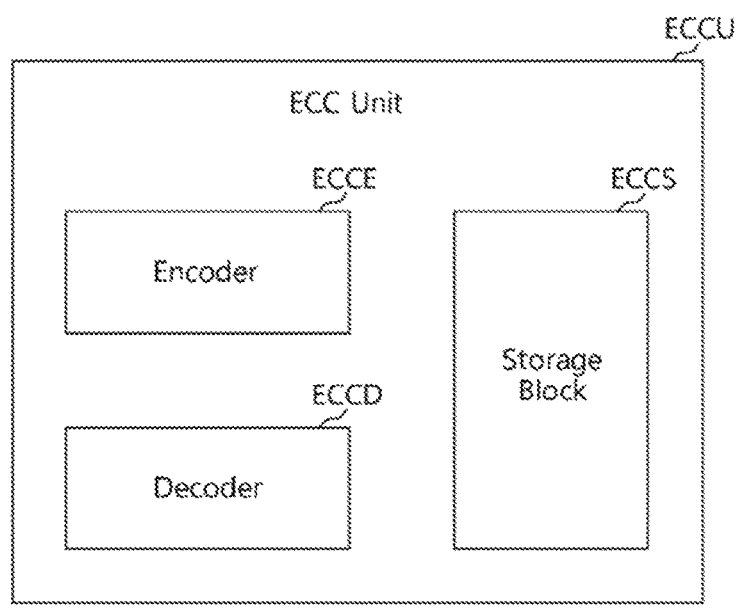
FIG. 3 is a block diagram illustrating an error correction unit in accordance with an embodiment.

FIG. 3 is a block diagram illustrating the error correction unit ECCU of FIG. 2 in accordance with an embodiment. The error correction unit ECCU included in the controller 200 and the error correction unit ECCU included in the nonvolatile memory device 300 may have the same configuration and perform the same operation. Therefore, as described above, the error correction unit ECCU may be included in either the controller 200 or the nonvolatile memory device 300.

Referring to FIG. 3, the error correction unit ECCU may include an error correction encoder ECCE for encoding data and an error correction decoder ECCD for decoding data. Also, the error correction unit ECCU may include an error correction storage block ECCS serving as a work space which temporarily stores data to be encoded and data to be decoded or is needed for encoding and decoding.

The encoder ECCE may encode original data to be stored in the memory device 300 by generating parity data for the original data according to one or more of various error correction schemes. The encoded data including the original data and the parity data may be stored in the memory device 300 and may be referred to as a codeword. The original data included in the codeword may be corrupted due to various reasons in the course of program and read operations. The decoder ECCD may decode data, which is included in the codeword read from the memory device 300 and corresponds to the original data, by detecting and correcting an error of the data based on the parity data also included in the codeword read from the memory device 300.

Examples of the various error correction schemes are a Bose-Chaudhuri-Hocquenghem (BCH) code scheme, a Reed-Solomon (RS) code scheme, an erasure RS code scheme and a low density parity check (LDPC) code scheme. Because the error correction algorithm is well known to those skilled in the art, detailed description thereof will be omitted herein.

Figure 4:
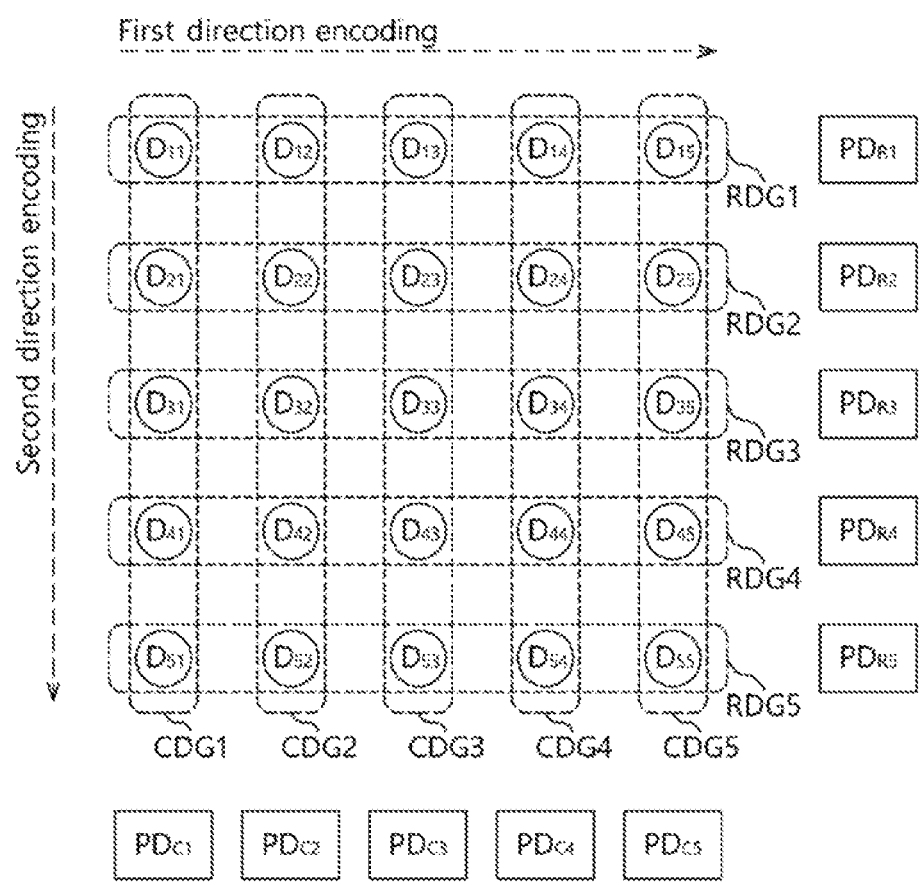
FIG. 4 is a diagram illustrating an error correction encoding operation in accordance with an embodiment.
Figure 5:
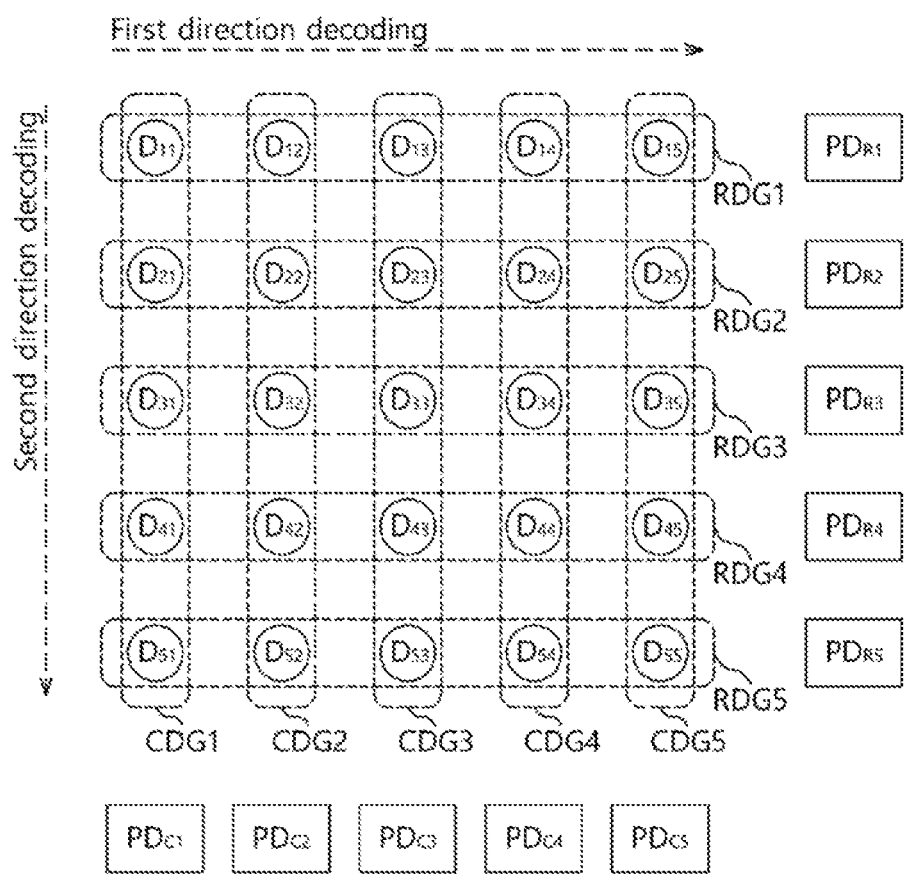
FIG. 5 is a diagram illustrating an error correction decoding operation in accordance with an embodiment.

FIG. 4 is a diagram illustrating an error correction encoding operation in accordance with an embodiment. FIG. 5 is a diagram illustrating an error correction decoding operation in accordance with an embodiment. For the sake of convenience in explanation, an error correction encoding operation and an error correction decoding operation to 25 data $D_{11}$ to $D_{55}$ arranged in a first direction and a second direction will be, exemplified. Further, for the sake of convenience in explanation, the first direction will be exemplified as a row direction and the second direction will be exemplified as a column direction. However, it is to be noted that the embodiment is not limited thereto, and for example, the first direction may be a column direction and the second direction may be a row direction.

Referring to FIG. 4, the data $D_{11}$ to $D_{55}$ may be encoded row by row. That is to say, the data $D_{11}$ to $D_{55}$ may be grouped row by row, and may be encoded by each of the row groups. As a result of the row-by-row encoding operation, row parity data PD corresponding to each of the row groups may be generated. For example, first row parity data $PD_{R1}$ may be generated when a first row data group RDG1 is encoded, second row parity data $PD_{R2}$ may be generated when a second row data group RDG2 is encoded, third row parity data $PD_{R3}$ may be generated when a third row data group RDG3 is encoded, fourth row parity data $PD_{R4}$ may be generated when a fourth row data group RDG4 is encoded, and fifth row parity data $PD_{R5}$ may be generated when a fifth row data group RDG5 is encoded.

Further, the data $D_{11}$ to $D_{55}$ may be encoded column by column. That is to say, the data $D_{11}$ to $D_{55}$ may be grouped column by column, and may be encoded by each of the column groups. As a result of the column-by-column encoding operation, column parity data PD corresponding to each of the column groups may be generated. For example, first column parity data $PD_{C1}$ may be generated when a first column data group CDG1 is encoded second column parity data $PD_{C2}$ may be generated when a second column data group CDG2 is encoded, third column parity data $PD_{C3}$ may be generated when a third column data group CDG3 is encoded, fourth column parity data $PD_{C4}$ may be generated when a fourth column data group CDG4 is encoded, and fifth column parity data $PD_{C5}$ may be generated when a fifth column data group CDG5 is encoded.

Since the encoding operation is performed for each of the row groups RDG1 to RDG5 and column groups CDG1 to CDG5 and each of the row parity data $PD_{R1}$ to $PD_{R5}$ and column parity data $PD_{C1}$ to $PD_{C5}$ is generated for the respective row and column groups, a decoding operation may be performed in each of the rows and the columns in the same manner as the encoding operation.

Referring to FIG. 5, the data $D_{11}$ to $D_{55}$ may be decoded row by row. In other words, a row-by-row decoding operation may be performed for each of the row data groups RDG1 to RDG5 using the row parity data $PD_{R1}$ to $PD_{R5}$, respectively. For example, the first row data group RDG1 may be decoded based on the first row parity data $PD_{R1}$, the second row data group RDG2 may be decoded based on the second row parity data $PD_{R2}$, the third row data group RDG3 may be decoded based on the third row parity data $PD_{R3}$, the fourth row data group RDG4 may be decoded based on the fourth row parity data $PD_{R4}$, and the fifth row data group RDG5 may be decoded based on the fifth row parity data $PD_{R5}$.

Further, the data $D_{11}$ to $D_{55}$ may be decoded column by column. In other words, a column-by-column decoding operation may be performed for each of the column data groups CDG1 to CDG5 using the column parity data $PD_{C1}$ to $PD_{C5}$. For example, the first column data group CDG1 may be decoded based on the first column parity data $PD_{C1}$, the second column data group CDG2 may be decoded based on the second column parity data $PD_{C2}$, the third column data group CDG3 may be decoded based on the third column parity data $PD_{C3}$, the fourth column data group CDG4 may be decoded based on the fourth column parity data $PD_{C4}$, and the fifth column data group CDG5 may be decoded based on the fifth column parity data $PD_{C5}$.

Figures 6, 7:
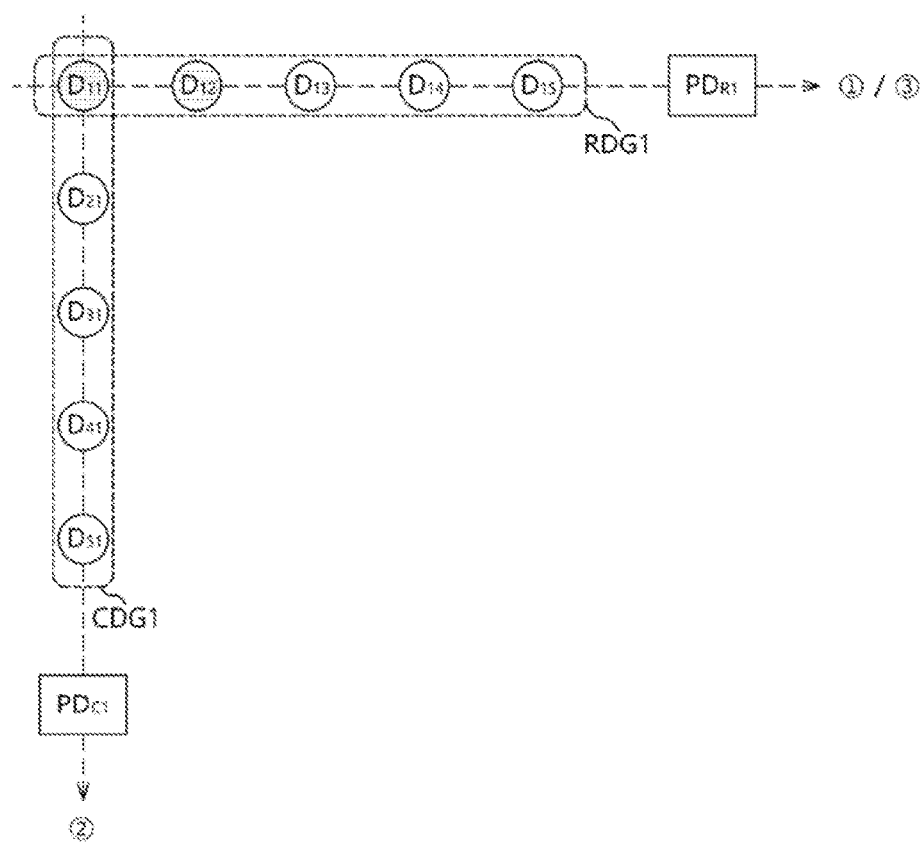
FIG. 6 is a diagram illustrating a dependency of decoding in a first direction and a second direction in accordance with an embodiment.
FIG. 7 is a table illustrating decoding, operations of FIG. 6.

FIG. 6 is a diagram illustrating a dependency of decoding in a first direction and a second direction in accordance with an embodiment. FIG. 7 is a table illustrating decoding operations of FIG. 6. For the sake of convenience in explanation, the row-by-row decoding operation to the first row data group RDG1 among the encoded data of FIG. 4 will be exemplified. Also, for the sake of convenience in explanation, a decoding operation capable of correcting only 1 data among 5 data will be assumed. However, the error correction capability of the decoding operation may not be limited thereto.

In a first procedure ①, the first row data group RDG1 may be decoded based on the first row parity data $PD_{R1}$. Because only 1 data may be corrected as assumed above and 2 error data $D_{11}$ and $D_{12}$ (illustrated as dot patterns) are included in the first row data group RDG1, the decoding operation to the first data group RDG1 will fail.

In a second procedure ②, the first column data group CDG1 may be decoded based on the first column parity data $PD_{C1}$. Because 1 error data $D_{11}$ is included in the first column data group CDG1, the decoding operation to the first column data group CDG1 will succeed. Namely, the error data $D_{11}$ will be corrected by the column-by-column decoding operation to the first column data group CDG1.

In a third procedure ③, the first row data group RDG1 may be decoded again based on the first row parity data $PD_{R1}$. Because the data $D_{11}$ included in the first row data group RDG1 was corrected in the decoding operation to the first column data group CDG1, the decoding operation to the first rove data group RDG1 will now succeed. Namely, the error data $D_{12}$ will be corrected by the row-by-row decoding operation to the first row data group RDG1.

Because the first row data group RDG1 and the first column data group CDG1 include at least one common data $D_{11}$, the row-by-row decoding operation to the first row data group RDG1 and the column-by-column decoding operation to the first column data group CDG1 may have dependency on each other.

That is to say, even though the decoding operation to a data group of the first direction fails partly due to an error of a common data shared by the data group of the first direction and a data group of second direction, if the error of the common data corrected by the decoding operation to the data group of the second direction, a subsequent decoding operation to the data group of the first direction may succeed.

In the first procedure ①, the case where the decoding operation fails since 2 error data $D_{11}$ and $D_{12}$ are included in the first row data group RDG1 is exemplified. However, n the case where error data within error correction capability, that is, 1 error data is included in the first row data group RDG1, the decoding operation to the first column data group RDG1 will succeed. In this case, the decoding operation, as in the second procedure ②, for the first column data group CDG1 that shares at least one common data with the first row data group RDG1 may be omitted.

Figure 8:
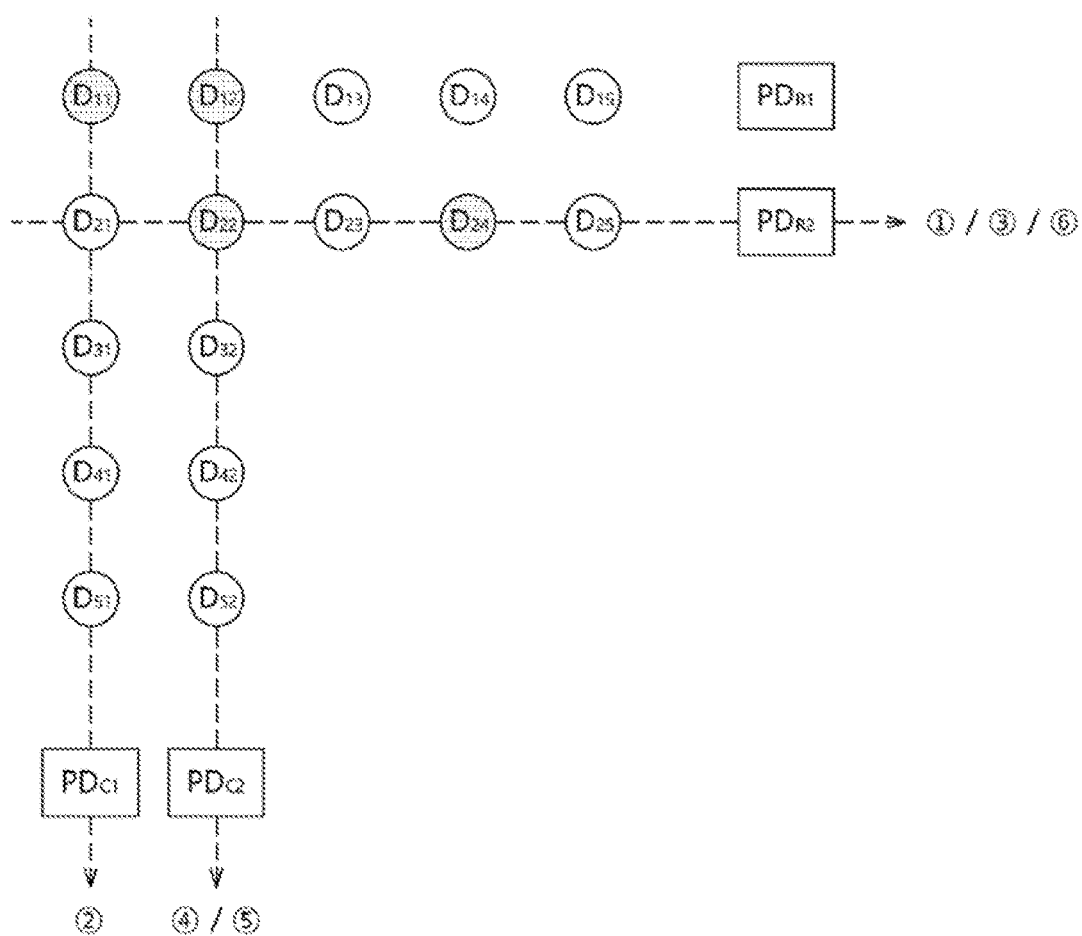
FIG. 8 is another diagram illustrating a dependency of decoding in a first direction and a second direction in accordance with the embodiment.

FIG. 8 is another diagram illustrating the dependency of decoding in a first direction and a second direction in accordance with an embodiment. FIG. 9 is a table illustrating decoding operations of FIG. 8. For the sake of convenience in explanation, a decoding operation to the second row data group RDG2 among the encoded data of FIG. 4 will be exemplified. Also, for the sake of convenience in explanation, a decoding operation capable of correcting only 1 data among 5 data will be assumed. However, the error correction capability of the decoding operation may not be limited thereto.

In a first procedure ①, the second row data group RDG2 may be decoded based on the second row parity data $PD_{R2}$. Because only 1 data may be corrected as assumed above and 2 error data $D_{22}$ and $D_{24}$ (illustrated as dot patterns) are included in the second data group RDG2, the decoding operation to the second row data group RDG2 will fail.

In a second procedure ②, the first column data group CDG1 may be decoded based on the first column parity data $PD_{C1}$. Because 1 error data $D_{11}$ is included in the first column data group CDG1, the decoding operation to the first column data group CDG1 will succeed. Namely, the error data $D_{11}$ will be corrected by the decoding operation to the first column data group CDG1.

In a third procedure ③, the second row data group RDG2 may be decoded again based on the second row parity data $PD_{R2}$. Although 1 error data $D_{11}$ independent of the error data $D_{22}$ and $D_{24}$ included in the second row data group RDG2 was corrected in the decoding operation to the first column data group CDG1, because the 2 error data $D_{22}$ and $D_{24}$ are still included in the second row data group RDG2, the decoding operation to the second row data group RDG2 will now fail.

In a fourth procedure ④, the second column data group CDG2 may be decoded based on the second column parity data $PD_{C2}$. Because 2 error data $D_{12}$ and $D_{22}$ are included in the second column data group CDG2, the decoding operation to the second column data group CDG2 will fail.

In a fifth procedure ⑤, the decoding operation to the second column data group CDG2 may be repeated by reflecting a decoding information on the second row data group RDG2.

The decoding information on the second row data group RDG2 may be a probability that the data $D_{22}$ as a common data shared by the second row data group RDG2 and the second column data group CDG2 is an error data.

For example, the decoding information on the second row data group RDG2 may mean a probability value of the data $D_{22}$ as the error data.

If the decoding operation to the second column data group CDG2 is repeated by reflecting the information that the data $D_{22}$ is the error data, an error data (e.g., the data $D_{22}$) beyond the error correction capability of the decoder ECCD may be error-corrected during the decoding operation to the second column data group CDG2. Due to the correction of the error data beyond the error correction capability of the decoder ECCD, the decoding operation to the second column data group CDG2 will succeed. In other words, by the decoding operation to the second column data group CDG2, both the 2 error data $D_{12}$ and $D_{22}$ or 1 error data $D_{22}$ will be corrected.

In a sixth procedure ⑥, the second row data group RDG2 may be decoded again based on the second row parity data $PD_{R2}$. Because the error data $D_{22}$ of the error data $D_{22}$ and $D_{24}$ included in the second column data group RDG2 was corrected by the decoding operation to the second column data group CDG2, the decoding operation to the second row data group RDG2 will now succeed. Namely, the error data $D_{24}$ will be corrected by the decoding operation to the second row data group RDG2.

Because the second row data group RDG2 and the second column data group CDG2 include at least one common data $D_{22}$, the row-by-row decoding operation to the second row data group RDG2 and the column-by-column decoding operation to the second column data group CDG2 may have dependency on each other.

Namely, even though the decoding operation to a data group of the first direction fails partly due to an error of a common data shared by the data group of the first direction and a data group of second direction, since the information on the failed decoding operation in the first direction is reflected on the decoding operation in the second direction, an error data beyond the error correction capability of the decoder ECCD may be corrected. If the error of the common data is corrected by the decoding operation to the data group of the second direction, a subsequent decoding operation to the data group of the first direction may succeed.

For the sake of convenience in explanation, it is illustrated that, after the decoding operation (the second procedure ②) for the first data group CDG1 is performed, the decoding operation (the third procedure ③) for the second data group RDG2 is repeated. However, it is to be noted that, after the decoding operation (the second procedure ②) for the first data group CDG1 and the decoding operation (the fourth procedure ④ or the fifth procedure ⑤) for the second data group CDG2 are performed, the decoding operation to the second data group RDG2 may be repeated.

Figure 10:
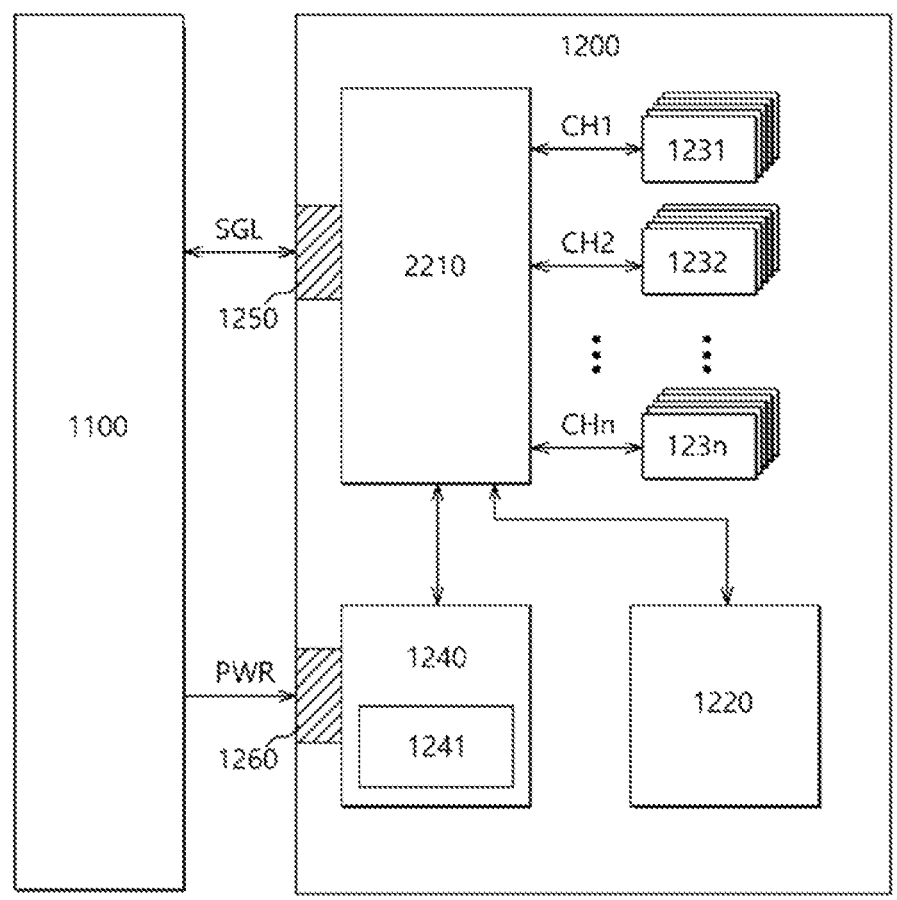
FIG. 10 is a diagram illustrating a data processing system including a solid state drive (SSD) in accordance with an embodiment.

FIG. 10 is a diagram illustrating a data processing system including a solid state drive (SSD) in accordance with an embodiment. Referring to FIG. 10, a data processing system 1000 may include a host device 1100 and a solid state drive (SSD) 1200.

The SSD 1200 may include a controller 1210, a buffer memory device 1220, nonvolatile memory devices 1231 to 123n, a power supply 1240, a signal connector 1250, and a power connector 1260.

The controller 1210 may control general operations of the SSD 1200.

The buffer memory device 1220 may temporarily store data to be stored in the nonvolatile memory devices 1231 to 123n. Further, the buffer memory device 1220 may temporarily store the data read from the nonvolatile memory devices 1231 to 123n. The data temporarily stored in the buffer memory device 1220 may be transmitted to the host device 1100 or the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to each channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacitance capacitors capable of charging power PWR.

The controller 1210 may exchange a signal SGL with the host device 1100 through the signal connector 1250. The signal SGL may include a command, an address, data, and so forth. The signal connector 1250 may be constructed by various types of connectors depending on an interface scheme between the host device 1100 and the SSD 1200.

Figure 11:
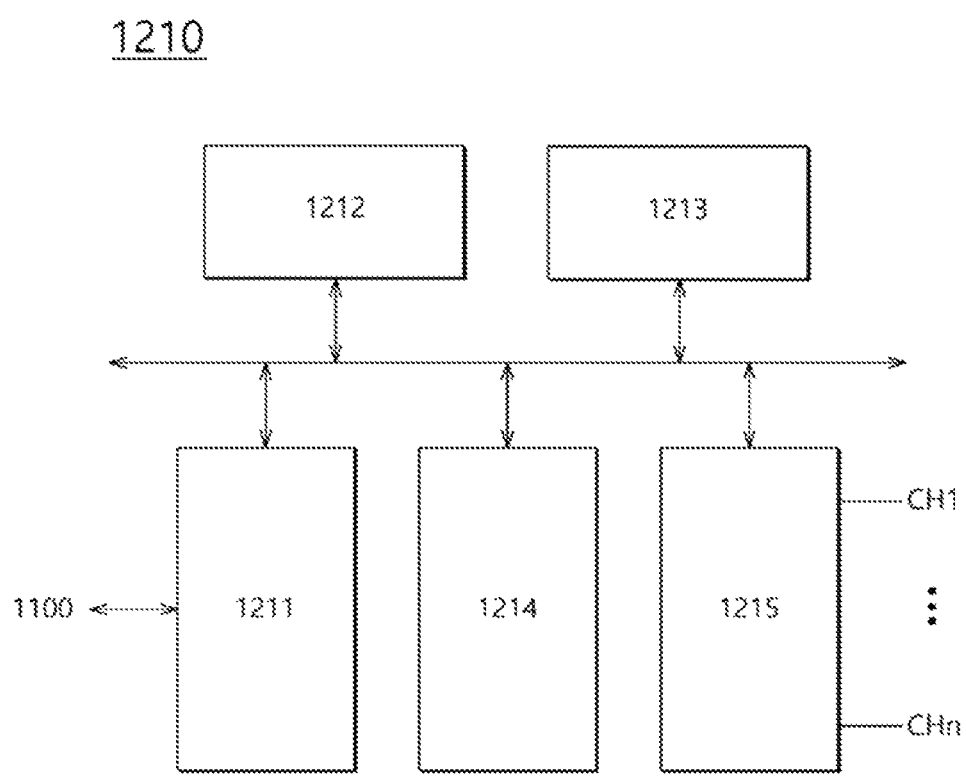
FIG. 11 is a diagram illustrating the controller shown in FIG. 10.

FIG. 11 is a diagram illustrating the controller shown in FIG. 10. Referring to FIG. 11, the controller 1210 may include a host interface unit 1211, a control unit 1212, a random access memory 1213, an error correction code (ECC) unit 1214, and a memory interface unit 1215.

The host interface unit 1211 may interface the host device 1100 and the SSD 1200 according to the protocol of the host device 1100. For example, the host interface unit 1211 may communicate with the host device 1100 through any one of secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS) protocols. In addition, the host interface unit 1211 may perform a disk emulating function for supporting the host device 1100 to recognize the SSD 1200 as a general purpose data storage device, for example, a hard disk drive (HDD).

The control unit 1212 may analyze and process the signal SGL inputted from the host device 1100. The control unit 1212 may control operations of internal function blocks according to a firmware or a software for driving the SSD 1200. The random access memory 1213 may be used as a working memory for driving such a firmware or software.

The error correction code (ECC) unit 1214 may generate the parity data of data to be transmitted to the nonvolatile memory devices 1231 to 123n. The generated parity data may be stored together with the data in the nonvolatile memory devices 1231 to 123n. The error correction code (ECC) unit 1214 may detect an error of the data read from the nonvolatile memory devices 1231 to 123n, based on parity data. If a detected error is within a correctable range, the error correction code (ECC) unit 1214 may correct the detected error.

The memory interface unit 1215 may provide control signals such as commands and addresses to the nonvolatile memory devices 1231 to 123n, according to control of the control unit 1212. Moreover, the memory interface unit 1215 may exchange data with the nonvolatile memory devices 1231 to 123n, according to control of the control unit 1212. For example, the memory interface unit 1215 may provide the data stored in the buffer memory device 1220, to the nonvolatile memory devices 1231 to 123n, or provide the data read from the nonvolatile memory devices 1231 to 123n, to the buffer memory device 1220.

Figure 12:
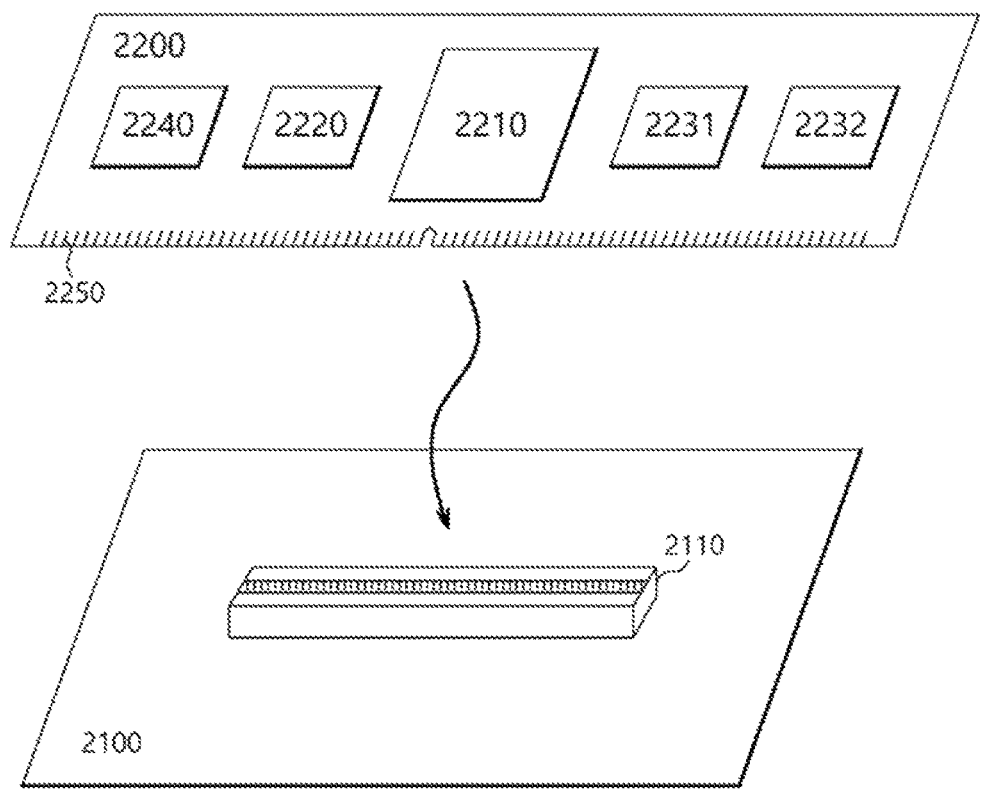
FIG. 12 is a diagram illustrating a data processing system including a data storage device in accordance with an embodiment.

FIG. 12 is a diagram illustrating a data processing system including a data storage device in accordance with an embodiment. Referring to FIG. 12, a data processing system 2000 may include a host device 2100 and a data storage device 2200.

The host device 2100 may be constructed in the form of a board such as a printed circuit board. Although not shown, the host device 2100 may include internal function blocks for performing the function of a host device.

The host device 2100 may include a connection terminal 2110 such as a socket, a slot or a connector. The data storage device 2200 may be mounted to the connection terminal 2110.

The data storage device 2200 may be constructed in the form of a board such as a printed circuit board. The data storage device 2200 may be referred to as a memory module or a memory card. The data storage device 2200 may include a controller 2210, a buffer memory device 2220, nonvolatile memory devices 2231 and 2232, a power management integrated circuit (PMIC) 2240, and a connection terminal 2250.

The controller 2210 may control general operations of the data storage device 2200. The controller 2210 may be configured in the same manner as the controller 1210 shown in FIG. 10.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the data storage device 2200.

The PMIC 2240 may provide the power inputted through the connection terminal 2250, to the inside of the data storage device 2200. The PMIC 2240 may manage the power of the data storage device 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the data storage device 2200. The connection terminal 2250 may be constructed into various types depending on an interface scheme between the host device 2100 and the data storage device 2200, The connection terminal 2250 may be disposed on any one side of the data storage device 2200.

Figure 13:
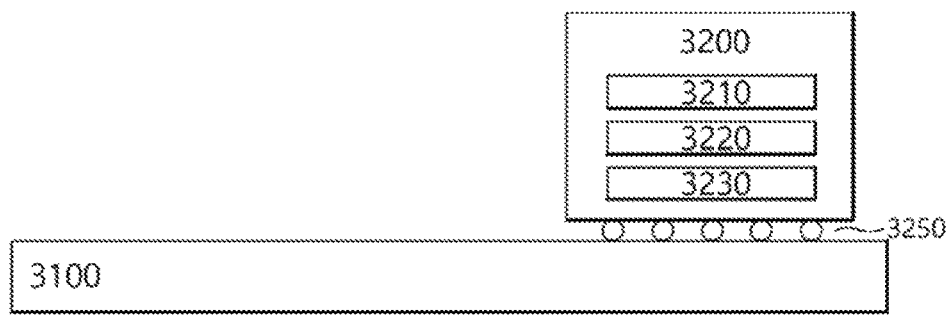
FIG. 13 is a diagram illustrating a data processing system including a data storage device in accordance with an embodiment.

FIG. 13 is a diagram illustrating a data processing system including a data storage device in accordance with an embodiment. Referring to FIG. 13, a data processing system 3000 may include a host device 3100 and a data storage device 3200.

The host device 3100 may be constructed in the form of a board such as a printed circuit board. Although not shown, the host device 3100 may include internal function blocks for performing the function of a host device.

The data storage device 3200 may be constructed in the form of a surface-mounting type package. The data storage device 3200 may be mounted to the host device 3100 through solder balls 3250. The data storage device 3200 may include a controller 3210, a buffer memory device 3220, and a nonvolatile memory device 3230.

The controller 3210 may control general operations of the data storage device 3200. The controller 3210 may be configured in the same manner as the controller 1210 shown in FIG. 10.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the data storage device 3200.

Figure 14:
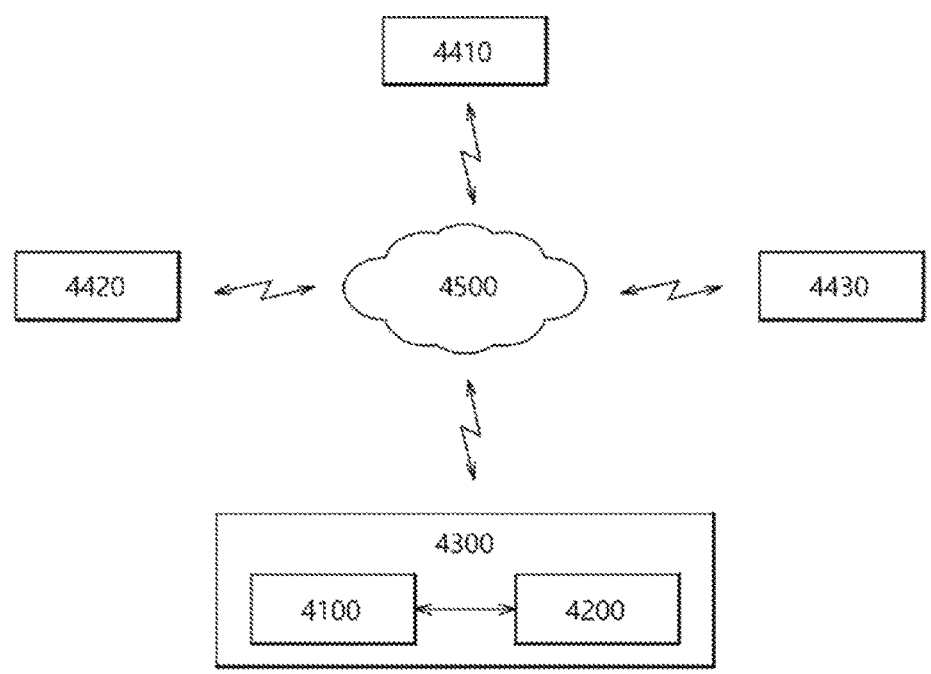
FIG. 14 is a diagram illustrating a network system including a data storage device in accordance with an embodiment.

FIG. 14 is a diagram illustrating a network system including a data storage device in accordance with an embodiment. Referring to FIG. 14, a network system 4000 may include a server system 4300 and client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and a data storage device 4200. The data storage device 4200 may be constructed by the data storage device 100 shown in FIG. 1, the data storage device 1200 shown in FIG. 10 the data storage device 2200 shown in FIG. 12 or the data storage device 3200 shown in FIG. 13.

While various embodiments have been described above, it will be understood to those skilled in the art that the embodiments described are examples only. Accordingly, the method for processing an error correction code of a data storage device described herein should not be limited based on the described embodiments.

What is claimed is:

1. An error correction method of an error correction unit for a plurality of data arranged in first and second directions, the error correction method comprising:
    performing a first encoding operation for a plurality of data groups of a first direction and generating encoding results for the plurality of data groups of the first direction;
    performing a second encoding operation for a plurality of data groups of a second direction and generating encoding results for the plurality of data groups of the second direction;
    performing a first decoding operation of correcting an error included in a data group among the plurality of data groups of the first direction, based on an encoding result of the first encoding operation corresponding to the data group of the first direction among a plurality of data groups; and
    performing a second decoding operation of correcting an error included in a data group among the plurality of data groups of the second direction, based on an encoding result of the second encoding operation corresponding to the data group of the second direction among a plurality of data groups when the first decoding operation fails,
    wherein the data group of the first direction shares one or more data with the data group of the second direction, and
    wherein the first decoding operation and the second decoding operation have dependency, in which even through the first decoding operation for the data group of the first direction fails, an error of common data shared by the data group of the first direction and the data group of the second direction is corrected through the second decoding operation for the data group of the second direction and a subsequent first decoding operation for the data group of the first direction succeeds, on each other.

2. The error correction method according to claim 1, further comprising repeating the first decoding operation of correcting errors included in remaining data groups among the plurality of data groups of the first direction and the second decoding operation of correcting errors included in remaining data groups among the plurality of data groups of the second direction when the second decoding operation succeeds so that the error of common data shared by the data group of the first direction and the data group of the second direction is corrected.

3. The error correction method according to claim 1, further comprising:
    obtaining a decoding information of the first decoding operation for the data group of the first direction when the second decoding operation for the data group of the second direction fails; and
    repeating the second decoding operation for the data group of the second direction by reflecting the decoding information of the first decoding operation,
    wherein the data group of the first direction includes error data including at least the common data and the data group of the second direction includes error data including at least the common data.

4. The error correction method according to claim 3, wherein the decoding information of the first decoding operation represents an error probability of the common data shared by the data group of the first direction and the data group of the second direction.

5. The error correction method according to claim 1, wherein
    performing the first encoding operation for the data group of the first direction includes generating first parity data for the data group of the first direction as the encoding result of the first encoding operation;
    performing the second encoding operation for the data group of the second direction includes generating second parity data for the data group of the second direction as the encoding result of the second encoding operation.

6. The error correction method according to claim 3, wherein, when the repeated second decoding operation by reflecting the decoding information of the first decoding operation succeeds, the first decoding operation is repeated.

7. The error correction code processing method according to claim 1, wherein, when the first decoding operation succeeds, the second decoding operation is omitted.

8. An error correction code processing method of a data storage device including a nonvolatile memory device used as a storage medium and an error correction code unit which performs an error correction code encoding operation and an error correction code decoding operation for data to be stored in and be outputted from the nonvolatile memory device, the error correction code processing method comprising:
    performing a first encoding operation of generating first parity data for a plurality of data groups of a first direction;
    performing a second encoding operation of generating second parity data for a plurality of data groups of a second direction which includes at least one data included in the data group of the first direction;

performing a first decoding operation of correcting an error included in a data group among the plurality of data groups of the first direction, based on the first parity data; and performing a second decoding operation of correcting an error included in a data group among the plurality of data groups of the second direction, based on the second parity data, in the case where the first decoding operation fails, wherein the first decoding operation and the second decoding operation have dependency, in which even through the first decoding operation for the data group of the first direction fails, an error of common data shared by the data group of the first direction and the data group of the second direction is corrected through the second decoding operation for the data group of the second direction and a subsequent first decoding operation for the data group of the first direction succeeds, on each other.

9. The error correction code processing method of a data storage device according to claim 8, wherein, when the second decoding operation succeeds so that the error of common data shared by the data group of the first direction and the data group of the second direction is corrected, the first decoding operation of correcting errors included in remaining data groups among the plurality of data groups of the first direction and the second decoding operation of correcting errors included in remaining data groups among the plurality of data groups of the second direction are repeated.

10. The error correction code processing method of a data storage device according to claim 8, wherein, when the second decoding operation for the data group of the second direction fails, the second decoding operation is repeated by reflecting decoding information for the data group of the first decoding operation.

11. The error correction code processing method of a data storage device according to claim 10, wherein the decoding information of the first decoding operation means a probability value of data included in common in the data group of the first direction and the data group of the second direction to be data "0" or data "1".

12. The error correction code processing method of a data storage device according to claim 10, wherein, when the second decoding operation performed again by reflecting the decoding information of the first decoding operation succeeds, the first decoding operation is performed again.

13. The error correction code processing method of a data storage device according to claim 8, wherein, when the first decoding operation succeeds, the second decoding operation is omitted.

* * * * *